US011023839B2

(12) United States Patent
Benefield

(10) Patent No.: US 11,023,839 B2
(45) Date of Patent: Jun. 1, 2021

(54) WORKFLOW INTEGRATION

(71) Applicant: MASTERCARD INTERNATIONAL INCORPORATED, Purchase, NY (US)

(72) Inventor: William Henry Benefield, Leopardstown (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 131 days.

(21) Appl. No.: 16/390,783

(22) Filed: Apr. 22, 2019

(65) Prior Publication Data
US 2019/0244145 A1 Aug. 8, 2019
US 2020/0272962 A9 Aug. 27, 2020

Related U.S. Application Data

(63) Continuation of application No. 14/940,428, filed on Nov. 13, 2015, now Pat. No. 10,346,781.

(30) Foreign Application Priority Data

Nov. 14, 2014 (GB) .................................. 1420280.8

(51) Int. Cl.
*G06Q 10/06* (2012.01)
*G06F 9/54* (2006.01)
(52) U.S. Cl.
CPC ......... *G06Q 10/0633* (2013.01); *G06F 9/541* (2013.01)
(58) Field of Classification Search
CPC ....... G06F 9/54; G06Q 10/06; G06Q 10/0633
See application file for complete search history.

(56) References Cited

U.S. PATENT DOCUMENTS

| 5,721,850 A | 2/1998 | Farry et al. |
| 5,734,837 A | 3/1998 | Flores et al. |
| 5,930,512 A | 7/1999 | Boden et al. |
| 6,574,675 B1 | 6/2003 | Swenson |
| 6,845,507 B2 | 1/2005 | Kenton |
| 7,047,535 B2 | 5/2006 | Lee et al. |
| 7,080,092 B2 | 7/2006 | Upton |
| 7,467,371 B1 | 12/2008 | Meredith et al. |
| 7,831,655 B2 | 11/2010 | Upton |

(Continued)

OTHER PUBLICATIONS

PCT International Search Report and Written Opinion, Application No. PCT/EP2015/076268, dated Feb. 25, 2016, 13 pps.

*Primary Examiner* — Tuan C Dao
(74) *Attorney, Agent, or Firm* — Armstrong Teasdale LLP

(57) ABSTRACT

A method of constructing a workflow is described. The method is carried out by a programmed processor and a memory of a computing apparatus using a workflow processing language. One or more hooks are provided in the workflow processing language. Each hook is adapted to provide a programming interface to one of one or more applications. An input stream is received and converted into an input object that can be processed by the workflow processing language. A workflow with hooks to one or more applications is then used. The one or more hooked applications are used through the programming interface provided by the respective hook to prepare and provide an output stream. The computer apparatus adapted to construct and perform such workflows is also described.

20 Claims, 4 Drawing Sheets

(56) References Cited

U.S. PATENT DOCUMENTS

| | | | |
|---|---|---|---|
| 8,126,722 | B2 | 2/2012 | Robb et al. |
| 8,140,469 | B2 | 3/2012 | Kumhyr et al. |
| 8,650,320 | B1 | 2/2014 | Merrick et al. |
| 8,660,853 | B2 | 2/2014 | Robb et al. |
| 8,752,030 | B1 | 6/2014 | Chen et al. |
| 2003/0084045 | A1 | 5/2003 | Anderson et al. |
| 2004/0153545 | A1* | 8/2004 | Pandya ............... H04L 41/5009 709/226 |
| 2006/0245414 | A1* | 11/2006 | Susai ................ H04L 63/0272 370/352 |
| 2006/0248466 | A1 | 11/2006 | Fedorenko et al. |
| 2007/0011334 | A1 | 1/2007 | Higgins et al. |
| 2007/0204020 | A1 | 8/2007 | Anderson et al. |
| 2008/0168082 | A1 | 7/2008 | Jin et al. |
| 2008/0300959 | A1* | 12/2008 | Sinha .................... G06Q 30/06 705/7.31 |
| 2010/0198636 | A1* | 8/2010 | Choudhary ........... G06F 21/552 705/7.28 |
| 2011/0131557 | A1 | 6/2011 | Bouillet et al. |
| 2011/0219078 | A1* | 9/2011 | Beresford-Wood .... G06F 15/16 709/205 |
| 2012/0173490 | A1 | 7/2012 | Gould et al. |
| 2013/0152041 | A1 | 6/2013 | Hatfield et al. |
| 2013/0227590 | A1 | 8/2013 | Flores et al. |
| 2014/0208294 | A1 | 7/2014 | Randhir et al. |
| 2014/0279764 | A1 | 9/2014 | Lahr |
| 2015/0089043 | A1 | 3/2015 | Phadke |

\* cited by examiner

WORKFLOW INTEGRATION

CROSS REFERENCE TO RELATED APPLICATIONS

This application is a continuation application of U.S. patent application Ser. No. 14/940,428, filed Nov. 13, 2015, entitled "WORKFLOW INTEGRATION", which claims the benefit of GB Patent Application No. 1420280.8 filed Nov. 14, 2014, the disclosures of which are hereby incorporated by reference in their entireties.

BACKGROUND OF THE DISCLOSURE

The present disclosure relates to integration of multiple applications into a workflow. In specific aspects, it relates to methods and applications for integrating multiple applications into a single workflow.

It is increasingly desirable in commercial operations to arrange workflows to run automatically, so that human input can be focused appropriately. In commercial operations which operate largely through information technology, it is normal to use many different software applications for different purposes. This creates a difficulty in the creation of an overall workflow, and often results in practice in significant human involvement in taking the output from one software application and using it to prepare an input for another software application.

One approach to automation of a workflow is to use enterprise resource planning (ERP) software (such as SAP ERP) that is adapted to provide the functions of the specific software applications that would otherwise be used. These software applications are then either replaced by an application within the ERP software, or are still used but under the control of the ERP software. While this can provide consistent results, it is an extremely expensive solution to adopt and typically requires major modification of workflows to adapt to the capabilities and requirements of the ERP software.

Another approach is not to use an ERP system but to use a specific workflow language, such as BPEL, for defining workflows. Such languages are typically written for use in particular contexts—for BPEL, for use in the web services model—and are devised for modelling of business and abstract processes rather than for effective interaction with other applications. Consequently, workflow languages require skilled programmer input and typically can make only limited use of the full capabilities of applications with which they interact, as the ability to use these capabilities needs to be built into the language itself.

Another approach to automation of a workflow is to require consistent input and output formats from all software used in the workflow. This may be done, for example, by requiring use of XML for output from and input to any applications interacting with the workflow application. This is also problematic, as it may prevent the use of many applications or require specialist programming to adapt their inputs and outputs—it will also require relatively good programming skills to develop any new element of the workflow.

It would be desirable to be in a position to develop new elements of a workflow without great programming skill, and to be able to use the full capabilities of a wide range of software applications adapted for specific purposes, all without the need to operate within the constraints of a complex (and expensive) enterprise resource management application.

BRIEF DESCRIPTION OF THE DISCLOSURE

In a first aspect, the disclosure provides a method of constructing a workflow for performance by a programmed processor and a memory of a computing apparatus using a workflow processing language. The method includes providing one or more hooks in the workflow processing language, wherein each hook is adapted to provide a programming interface to an associated application of one or more applications, receiving an input stream, converting the input stream into an input object that can be processed by the workflow processing language, using a workflow with the one or more hooks to the one or more applications, and utilizing the one or more hooked applications through the programming interfaces provided by the respective hooks to prepare and provide an output stream.

The workflow may also provide an output object, and convert the output object into an output stream. The output stream may be directed to a hooked application, and the input stream may be received from a hooked application.

At least one hook may implement an existing application programming interface for its hooked application. In some cases, the hook provides a new programming interface for an application. This may apply when the application is a database.

In some embodiments, the input stream may be received from, or the output stream provided to, an e-mail application.

The input stream may be one of a plurality of input streams. These may include input streams received from one or more of a manual script, a web call, a web request, an e-mail application and a hooked application.

The output stream may be one of a plurality of output streams. These may include output streams provided to one or more of an e-mail application, a database and a hooked application.

The hooked applications may include one or more of issue tracking software, inventory management software, an e-mail application and a database.

In some embodiments, each hook is implemented by a hook function to establish interaction with the hooked application, an initialization function to provide initial values for the hooked application, and an execution function for use when the hooked application is called as a function. The execution function may operate on a hashmap containing the command and arguments to be passed to the hooked application.

In a second aspect, the disclosure provides a computing apparatus including a processor and a memory, wherein the processor is programmed with a workflow processing language stored in the memory. The workflow processing language includes a plurality of hooks wherein each hook is adapted to provide a programming interface to an associated application of a plurality of hooked applications. The workflow processing language further includes one or more input object creators, each adapted to convert an input stream from a specific input source into an input object that can be processed by the workflow processing language, and one or more output stream creators each adapted to provide an output stream. The processor programmed with the workflow processing language is adapted to construct workflows that receive input streams and use hooked applications to prepare and provide one or more output streams.

The memory may also contain one or more hooked applications, the hooked applications including one or more of issue tracking software, inventory management software, an e-mail application, and a database.

Each hook may be implemented by a hook function to establish interaction with the hooked application, an initialization function to provide initial values for the hooked application, and an execution function for use when the hooked application is called as a function.

BRIEF DESCRIPTION OF THE DRAWINGS

Embodiments of the disclosure will now be described, by way of example, with reference to the accompanying Figures, of which.

DETAILED DESCRIPTION OF THE DISCLOSURE

Specific embodiments of the disclosure will be described below with reference to the Figures.

Figure 1:
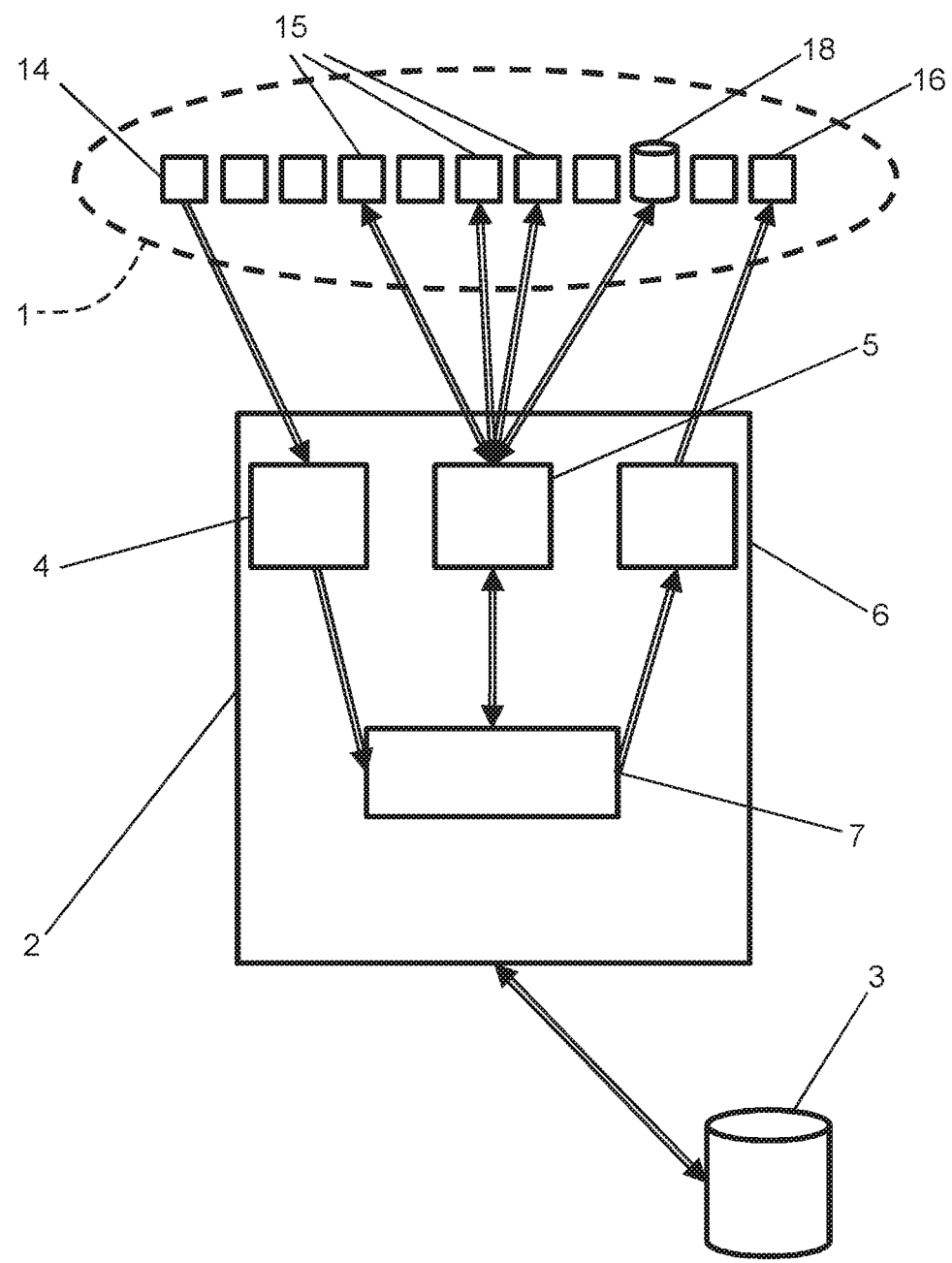
FIG. 1 illustrates schematically a functional architecture according to an example embodiment of the disclosure.

FIG. 1 illustrates schematically a functional architecture according to an example embodiment of the disclosure adapted to construct a workflow using a plurality of disparate applications.

The applications are shown within a general application space 1 which interacts with a workflow engine 2. The applications are shown as being of three types: input applications 14 providing an input to the workflow engine 2, output applications 16 accepting an output from the workflow engine 2, and "hooked" applications 15 that are used by the workflow engine 2 in the course of executing a workflow. While each of the example applications shown only belong to one of the three categories in the embodiment illustrated, this is not required—it is possible for an application to be in any two, or all three, of these categories.

The workflow engine 2 interacts with a workflow database 3, and a central element of the workflow engine 2 is the workflow application layer 7. Input streams from input applications 14 are received by an input object creator 4 and converted into input objects adapted for use by the workflow application layer 7. Likewise, output objects provided by the workflow application layer 7 are provided to an output stream creator 6, which provides output streams to the output applications 16.

Hooked applications 15 are applications that are called by the workflow application layer 7 during operation of a workflow. The workflow application layer 7 accesses each hooked application by means of a hook 5, the hook 5 providing in effect a programming interface for the hooked application 15 in a form usable by the workflow application layer 7. While a hooked application 15 is typically a software package discrete from the workflow application layer, in some cases the hooked application 15 may not be a discrete application. For example, a hooked database 18 is a database rather than an application, but with the addition of an interface provided as a hook allowing functions such as searching of and extracting data from the database, the combination of hook 5 and hooked database 18 takes the role of an application.

Using this approach, a programmer may generate workflows that use the capabilities of the hooked applications 15 effectively without requiring wider programming knowledge than is needed to program in the language of the workflow application layer 7. The hooks 5 need to be written by a programmer with knowledge both of the language of the workflow application layer 7 and the relevant application, but hooks can be written once and provided in a library for use by workflow generating programmers. Moreover, the hooks 5 will typically use an existing API (application programmer interface) for the relevant application, in which case the hook 5 itself may not be especially complex to produce.

Figure 2:
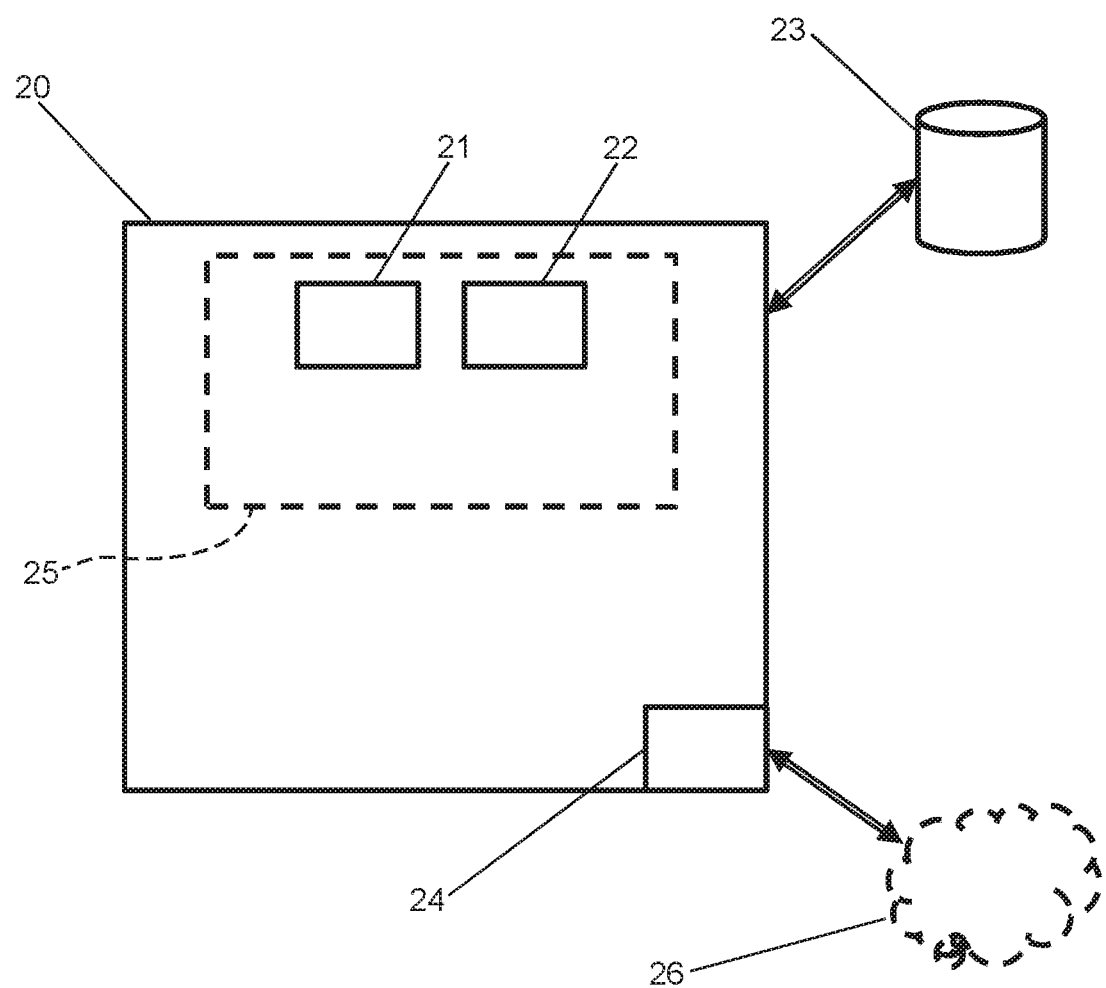
FIG. 2 illustrates a computer system that may be used to implement example embodiments of the disclosure.

This architecture may be implemented on any appropriate computing platform. An example arrangement is shown in FIG. 2. A server 20 including a processor 21 and a memory 22 and in communication with storage 23 is provided with a networking interface 24 to interact with other computing apparatuses. Applications running on the server 20 are represented as running within an execution environment 25 including the processor 21 and the memory 22—the applications will typically be stored within the memory 22 and run on the processor 21. Of the applications shown in FIG. 1, the workflow engine 2 will generally run in this execution environment 25, as will instances of most applications shown in the application space 1. Data required by the applications will typically be located in storage 23. Many variations on this arrangement are possible. For example, rather than a single server 20, the functions shown may be spread over a number of interacting computers, for example as a virtual machine operating within a data center comprising multiple servers. Any of the applications shown may be performed at least partly on other computing apparatus interacting with the server 20 through the networking interface 24, for example through a public internet 26.

The elements of the architecture shown in FIG. 1 will now be described in more detail. After this, examples of use of the architecture to produce workflows will be described.

The applications within application space 1 may be of any kind that the workflow designer would need to interact with a workflow, either by providing inputs to the workflow, receiving outputs from the workflow, or for use by the workflow to achieve an objective. Many applications will fall into more than one of these categories.

Examples will be provided here for the context of maintenance of an IT infrastructure, including the logging of analysis of problems. Applications that may be required in this context are e-mail both for input and output, issue tracking applications (such as JIRA) for all three categories, and asset management applications (such as Maximo) for all three categories. Also treated as applications for this purpose are various other mechanisms to provide input and output, such as web calls and requests and manual scripts—these will typically not be hooked applications where they are simply means to provide input to, or accept output from, an application. However, databases used by the workflow will typically be treated as applications—the combination of the database and a hook providing an interface to the database may be treated by the workflow in the same way as a call to an application. In the IT maintenance context discussed here, inventory, configuration, and vulnerability databases may all be treated this way. Some databases may also receive an output stream—for example, a vendor ticket database may be hooked and used during a workflow, but it may also receive an update as an output stream from a workflow.

The main workflow application layer runs workflow scripts. These workflow scripts may be written in a workflow scripting language developed for use with this architecture—embodiments of the disclosure described here use a language named WALDO. Aspects of WALDO will be described further below, and for convenience the following description will generally refer to WALDO when referring to the language used by the workflow application layer. As the skilled person will appreciate, other embodiments of the disclosure may use other languages to generate scripts, and references to WALDO below may be replaced in other implementations by references to any other suitable language. WALDO is designed to be relatively simple to use to generate workflow script, and is designed for use with input streams, output streams and hooked applications as described here.

Input streams are entry points into the main workflow application layer. Input is received from a source associated with a particular workflow—this may be a received e-mail message, an output from some particular application, or even a manual script. The received input stream is then encapsulated into an input object that can be interpreted by WALDO (as stated above, references to WALDO from here onwards in the description of the general system may be considered as references to the language of the workflow application layer in the implementation used). A suitable module is written for each application or input type to perform this processing. The collection of modules and other functionality required to convert input streams into input objects is shown in FIG. 1 as the input object creator 4. This layer is effectively separated from the WALDO scripts by a layer of abstraction.

Similarly, output streams are exit points from the main workflow application layer into applications. Typically, output will be into hooked applications that not only receive input from the workflow application layer but which are also may be manipulated by WALDO scripts by virtue of the hook. The process of creating an output stream is essentially the reverse of creating an input object. An output object from a WALDO script is converted into an output stream suitable for use by the application to which it is being sent by an appropriate output stream creator. In some cases little or no processing may be needed in the output stream creator (in some cases, it may be the direct output of a WALDO script), but in others a module needs to be written for the relevant application as before. Again, this layer should be seen as separated from the WALDO scripts by a layer of abstraction.

WALDO (derived from "Widely Accessible Language for Defining Inter-Operability) will now be described in more detail. It is a dynamic scripting language developed to allow non-programmers to write scripts to manipulate external applications, and does not require extensive knowledge of programming fundamentals to use. It is primarily written in PERL, but may use other languages (such as Python, JavaScript, HTML/CSS, PHP, Java and Bash scripting) as necessary and appropriate (generally for effective interaction with a particular external application).

WALDO contains the following features:
ability to include external or additional scripts as part of program execution;
ability to create user defined functions;
recursion functionality, including loop error detection logic;
looping mechanisms (e.g., while, for, for each); and
communication between external modules (through hooks).

The use of dynamically coded hooks to interact with applications is a particularly significant aspect of WALDO. This approach means that the number and type of applications that can interact with a WALDO workflow is essentially unlimited. The intention is to allow applications to access object spaces of any other application within the framework. WALDO is primarily designed to facilitate such interaction, rather than to implement any particular set of functions.

Hooks, and the implementation of hooks in WALDO, will now be described in more detail.

A hook is a mechanism to allow an application to be accessed by a WALDO script in such a way that the normal functionality of the application is fully available. WALDO effectively provides an application programming interface (API) for the application. The mechanism of implementation in WALDO is similar to the implementation of external libraries—hooks resemble external libraries written in PERL, and in some ways the process of implementing hooks is analogous to the compilation of JAVA classes in C/C++.

In some cases, an application will provide a readily adaptable API (such as the representational state transfer (ReST) API of JIRA, which can be implemented effectively as a WALDO hook). In other cases, there may not be a full API available (or there may be no API at all—for example, if what is to be accessed is a bare database), but an effective API can readily be developed in the hook for use by a WALDO scripter.

In the implementation described, each hook includes at least the following three functions: new, initialize, and hook. These three functions will be described below and illustrated with exemplary PERL code.

Function: new ( )

This function must return the hook object. The hook is required to have a sub variable, in the form of a hash, named 'vars'. WALDO will be able to directly interact with any data placed within this variable.

```
sub new
{
    my $this = { 'vars' => { }, };
    bless $this, $_[0];
    return $this;
}
Function: init_hook ( )
```

This function will be called by WALDO whenever the hook is 'hooked' into the currently running script. It should ideally setup whatever values are required for base hook operation. Examples of things that can be done within this initialization routine would be setting custom constants within the WALDO object. When WALDO hooks the object, it will set a variable called 'parent' within the hook object itself prior to calling init_hook( ) This variable points to the WALDO object itself and allows the hook to communicate with the WALDO container that is using it.

```
sub init_hook
{
    if (! (defined $_[0]->{'parent'}->{'bound'} &&
          defined $_[0]->{'parent'}->{'bound'}->{'hooks:<hookName>'}))
    {
        if (defined $_[0]->{'parent'})
        {
            $_[0]->{'parent'}->{'bound'}->{'hooks::<hookName>'} = 1;
Setup whatever data is required here. As we are setting a bind
variable against setting this up previously, this will only be
```

```
executed once to protect data integrity.
    }
   }
}
Function: hook (hashmap $map)
```

This function is called when a hook is referenced within a WALDO script. It will return zero if the function call is successful and non-zero if there was a problem. Negative numbers indicate a fatal error occurred within the call, while positive numbers indicate a non-fatal problem within execution.

The argument provided to this function is a hashmap. It contains the command and arguments passed into the function. $map takes the form of:

```
$map =
{
 'argv' =>
 [
   0 => 'exampleHook',
   1 => 'command',
   2 => 'arg1',
   3 => 'arg2',
 ],
 'argc' => 3,
 'line' => 'exampleHook command arg1 arg2',
};
```

The commands and arguments passed will then be parsed via the following function stub:

```
sub hook
{
 if(! (defined $_[0]->{'parent'}))
 {
  print "[ exampleHook ] : parent is not defined!\n";
  return 1;
 }
 $_[0]->{'parent'}->func ("exampleHook", 1, \@{ $_[1]->{'argv'} });
 if ($_[1]->{'argc'} < 1)
 {
  $_[0]->{'parent'}->warning (sprintf ("[ exampleHook ] syntax: exampleHook {cmd}"));
  return $_[0]->{'parent'}->func ("exampleHook", 0, 2);
 }
 my $cmd = $_[0]->{'parent'}->convert_value ($_[1]->{'argv'}[1], "");
 given ($cmd)
 {
  when ('command')
  {
   ### Do something
   return $_[0]->{'parent'}->func ("exampleHook", 0, 0); ### Success!
  }
 }
 $_[0]->{'parent'}->warning ("[ exampleHook ] : unknown command [$cmd] passed.");
 return $_[0]->{'parent'}->func ("exampleHook", 0, 3);
}
```

The use of these three elements can be illustrated further by use of an example—one case would be that of a database (here termed "Atlas") that has no API and a set of database tables. This could be accessed by first loading the hook that tells the workflow engine that the Atlas hook module is to be used:

hook Atlas

This hook then needs to be initialized. In the case of a bare database, all that is required is for a connection to be made to the database. After initialization, the hooked application waits for "Atlas" commands in the workflow. When these are identified, they are passed to the hook module, which will interpret them as valid commands. An exemplary query is the following:

Atlas query type=host "host=${SERVERS.${server}.Host}"
type=component "component=${SERVERS.${server}.Instance}"

This command would be interpreted by the Atlas hook and broken out into a number of different items. The Atlas module reads this as "I want to search for a host named ${SERVERS.${server}.Host}" and a component type of "${SERVERS.${server}.Instance}". The Atlas hook knows how to interact with the Atlas database, and it then performs the required queries to build the data it needs to find.

Figure 3:
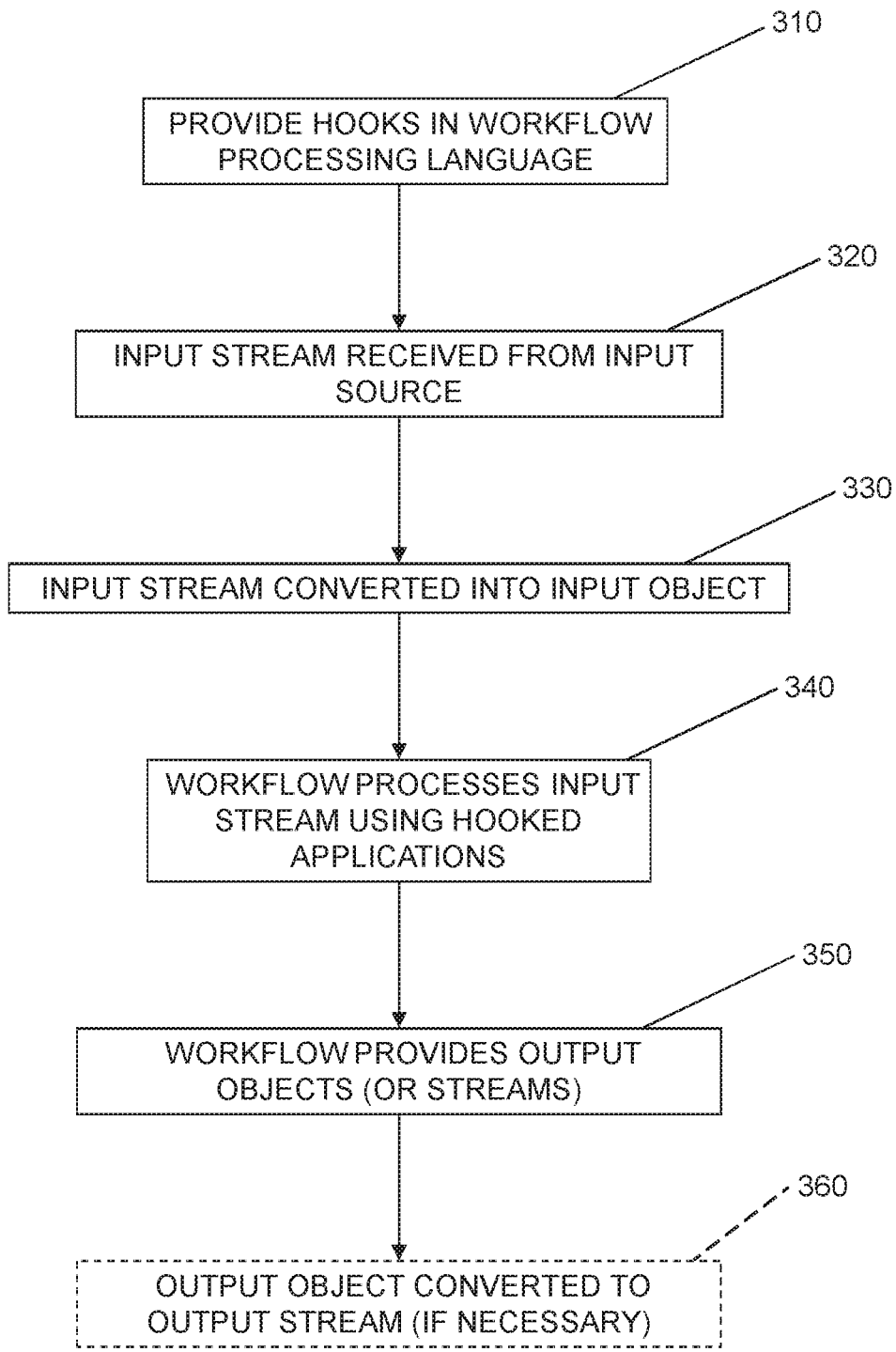
FIG. 3 illustrates a flow diagram of a method according to an example embodiment of the disclosure.

An example embodiment of a method of constructing a workflow is illustrated in FIG. 3. A first step is to provide a workflow processing language utilizing hooks 310, wherein the hooks are each adapted to provide a programming interface to a different application. When accessed in a workflow by means of a hook, these applications may be described as "hooked applications". An input stream is received 320 from an input source (this may be an application, a script, or some other kind of input) and converted 330 into an input object that can be processed by the workflow processing language. A workflow is then used 340 to process the input stream or streams, the workflow accessing one or more hooked applications through the programming interface provided by the respective hook. The workflow then prepares and provides 350 one or more output objects. These output objects may then be converted 360 into output streams for use by specific applications.

Figure 4:
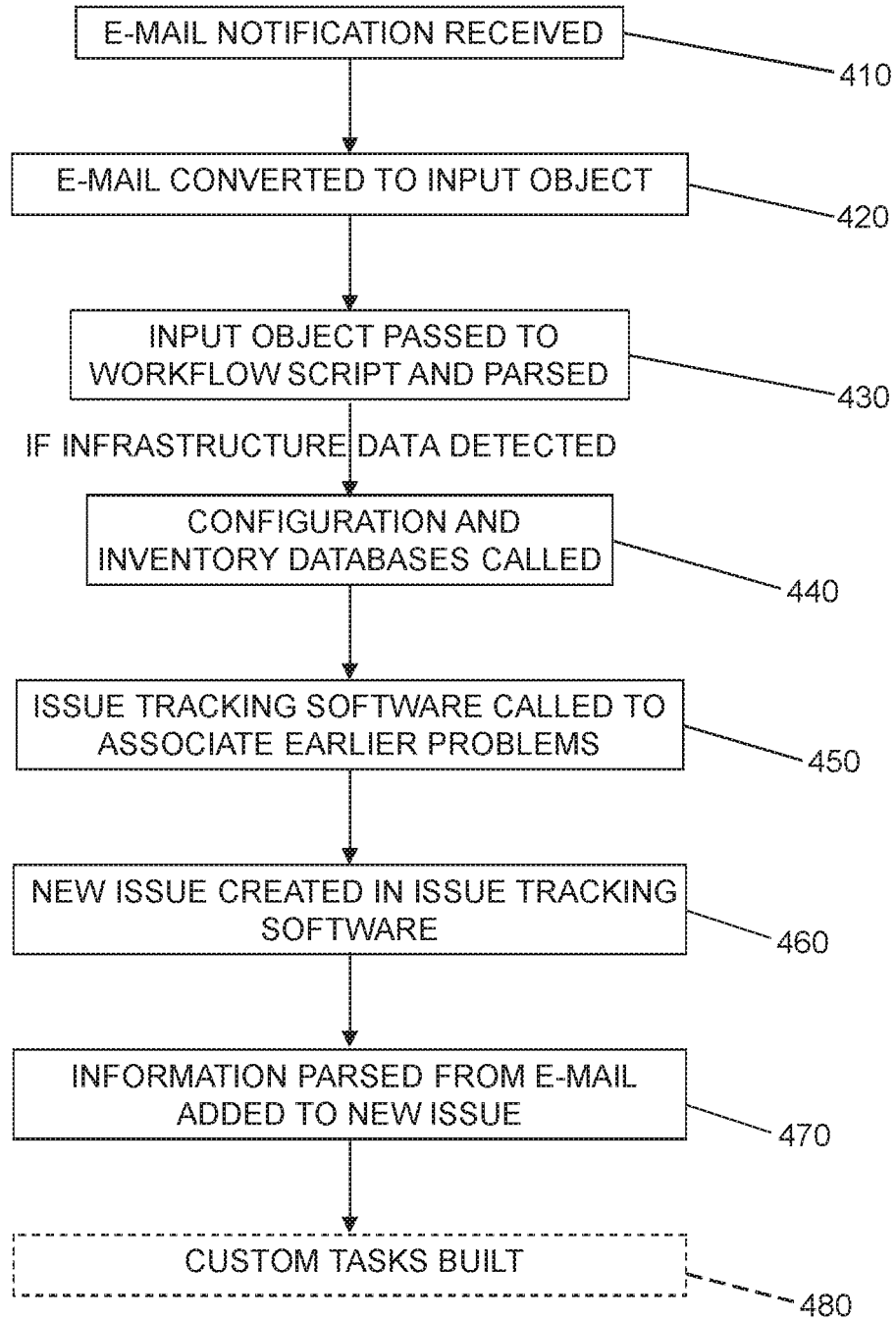
FIG. 4 illustrates a flow diagram of an exemplary workflow according to an example embodiment of the disclosure.

An example workflow using an example embodiment of the disclosure is illustrated in FIG. 4. The workflow shown is directed to receiving notifications about an infrastructural problem and to recording the notification appropriately, associating it with related problems already recorded.

An e-mail is received 410 that provides notification of an infrastructure alert or a problem escalation. This email is picked up by the e-mail hook and converted 420 into a WALDO readable object. This input object is passed along to a WALDO script which then parses 430 the input object in an attempt to discover content which can be used by the workflow. If data is detected that relates to an infrastructure, the WALDO script will call 440 configuration and inventory databases, and will look for additional information about the particular components that are associated with the problem escalation. In this workflow, a key hooked application is the issue tracking software JIRA. The workflow calls 450 JIRA in an attempt to associate the present problem with related past problems—this is particularly valuable if the past problems have previously defined solutions within JIRA. A new issue is also created 460 in JIRA, and information parsed from the e-mail is added 470 in the issue. Custom tasks are built 480 depending on the information found in JIRA and the inventory and configuration databases. For example, if a JAVA virtual machine (VM) were discovered to be linked to the e-mail, a subtask containing a complete set of details for that VM would be placed appropriately in JIRA.

This approach therefore allows the full functionality of JIRA to be used within a workflow implementing a WALDO script. While this example relates specifically for issue tracking for problems identified in an IT infrastructure, other embodiments of the disclosure may relate to completely different technical contexts while still allowing interaction between the full capabilities of different applications external to the workflow engine.

Although the present disclosure has been described in connection with specific embodiments, it should be understood that various changes, substitutions, and alterations apparent to those skilled in the art can be made to the disclosed embodiments without departing from the spirit and scope of the disclosure as set forth in the appended claims.

What is claimed is:

1. A method of constructing a workflow, the method implemented using a workflow engine computing device including a processor in communication with a memory, the workflow engine computing device configured to process data objects using a workflow processing language, the method comprising:
   receiving, at the workflow engine computing device, an input stream from an input application;
   converting, using the workflow engine computing device, the input stream into an input object that can be processed using the workflow processing language;
   accessing at least one application using at least one hook of the workflow engine computing device, wherein the at least one hook provides a programming interface between the workflow engine computing device and the at least one application;
   processing the input object in the workflow processing language with the at least one accessed application to generate an output object;
   converting the output object into an output stream using the workflow engine computing device; and
   transmitting the output stream from the workflow engine computing device to an output application.

2. The method of claim 1, wherein converting the output object comprises:
   providing the output object to an output stream creator of the workflow engine computing device; and
   converting the output object into the output stream using the output stream creator.

3. The method of claim 2, wherein the output stream is directed to the output application.

4. The method of claim 2, wherein at least one of i) the input stream is received from an e-mail application or ii) the output stream is provided to the e-mail application.

5. The method of claim 2, wherein the output stream is one of a plurality of output streams provided to at least one of an e-mail application, a database, and a hooked application.

6. The method of claim 1, wherein the at least one hook provides an existing application programming interface for the at least one application.

7. The method of claim 1, wherein at the at least one hook provides a new programming interface for the at least one application.

8. The method of claim 7, wherein the at least one application is a database.

9. The method of claim 1, wherein the input stream is one of a plurality of input streams received from at least one of a manual script, a web call, a web request, an e-mail application, and a hooked application.

10. The method of claim 1, wherein the at least one application includes at least one of issue tracking software, inventory management software, an e-mail application, and a database.

11. The method of claim 1, wherein each hook is implemented by a hook function to establish interaction with the at least one application, an initialization function to provide initial values for the at least one application, and an execution function for use when the at least one application is called as a function.

12. The method of claim 11, wherein the execution function operates on a hashmap containing a command and arguments to be passed to the at least one application.

13. A workflow engine computing device comprising:
   a memory; and
   at least one processor, wherein the at least one processor is in communication with the memory and is configured to process data objects using a workflow processing language, the workflow engine computing device configured to:
   receive an input stream from an input application;
   convert the input stream into an input object that can be processed using the workflow processing language;
   access at least one application using at least one hook of the workflow engine computing device, wherein the at least one hook provides a programming interface between the workflow engine computing device and the at least one application;
   process the input object in the workflow processing language with the at least one accessed application to generate an output object;
   convert the output object into an output stream; and
   transmit the output stream to an output application.

14. The workflow engine computing device of claim 13, wherein to convert the output object, workflow engine computing device is configured to:
   provide the output object to an output stream creator of the workflow engine computing device; and
   convert the output object into the output stream using the output stream creator.

15. The workflow engine computing device of claim 13, wherein the at least one hook provides an existing application programming interface for the at least one application.

16. The workflow engine computing device of claim 13, wherein each hook is implemented by a hook function to establish interaction with the at least one application, an initialization function to provide initial values for the at least one application, and an execution function for use when the at least one application is called as a function.

17. One or more non-transitory computer-readable storage media having computer-executable instructions embodied thereon for constructing a workflow using a workflow engine computing device configured to process data objects using a workflow processing language, wherein the computer-executable instructions when executed by at least one processor, cause the at least one processor to:
   receive an input stream from an input application;
   convert the input stream into an input object that can be processed using the workflow processing language;
   access at least one application using at least one hook of the workflow engine computing device, wherein the at least one hook provides a programming interface between the workflow engine computing device and the at least one application;
   process the input object in the workflow processing language with the at least one accessed application to generate an output object;
   convert the output object into an output stream; and
   transmit the output stream from the workflow engine computing device to an output application.

18. The one or more non-transitory computer-readable storage claim 17, wherein to convert the output object, the computer-executable instructions cause the processor to:

provide the output object to an output stream creator of the workflow engine computing device; and convert the output object into the output stream using the output stream creator.

19. The one or more non-transitory computer-readable storage media of claim 17, wherein the at least one hook provides an existing application programming interface for the at least one application.

20. The one or more non-transitory computer-readable storage media of claim 17, wherein each hook is implemented by a hook function to establish interaction with the at least one application, an initialization function to provide initial values for the at least one application, and an execution function for use when the at least one application is called as a function.

* * * * *